(12) United States Patent
Ballantine et al.

(10) Patent No.: US 6,446,123 B1
(45) Date of Patent: Sep. 3, 2002

(54) TOOL FOR MONITORING HEALTH OF NETWORKS

(75) Inventors: Peter Roy Ballantine, Dunrobin (CA); Gorete M. Almeida, Denver, CO (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/281,945

(22) Filed: Mar. 31, 1999

(51) Int. Cl.[7] .............................................. G06F 13/00
(52) U.S. Cl. ...................................... 709/224; 709/223
(58) Field of Search ................................ 370/254, 469; 379/34; 455/423; 709/223, 224

(56) References Cited

U.S. PATENT DOCUMENTS

| | | | |
|---|---|---|---|
| 6,049,827 A | * | 4/2000 | Sugauchi et al. ........... 709/223 |
| 6,115,393 A | * | 9/2000 | Engel et al. ................. 370/469 |
| 6,181,776 B1 | * | 1/2001 | Crossley et al. .............. 379/34 |
| 6,233,449 B1 | * | 5/2001 | Glitho et al. ................ 455/423 |
| 6,259,679 B1 | * | 7/2001 | Henderson et al. ......... 370/254 |
| 6,260,062 B1 | * | 7/2001 | Davis et al. ................. 709/223 |
| 6,349,325 B1 | * | 2/2002 | Newcombe et al. ........ 709/202 |

* cited by examiner

*Primary Examiner*—N. Le
*Assistant Examiner*—Walter Benson
(74) *Attorney, Agent, or Firm*—Finnegan, Henderson, Farabow, Garrett & Dunner, L.L.P.

(57) ABSTRACT

A software tool for monitoring network performance, traffic, inventory, breakdown, repair activity, and other conditions, alerts a user to anticipated problems based upon projection of performance and related data. The software can also suggest appropriate solutions, schedules proactive maintenance based upon anticipated fail date, importance to the network, repairperson availability, and company policy. A user can set the parameters of the software tool to provide customized network maintenance.

57 Claims, 6 Drawing Sheets

TOOL FOR MONITORING HEALTH OF NETWORKS

BACKGROUND OF THE INVENTION

The present invention relates generally to software tools, and more particularly to a software tool for proactively monitoring network "health," anticipating unacceptable network performance, alerting a network operator of unacceptable network performance, and automatically scheduling network maintenance based on anticipated unacceptable network performance.

Determining the need to upgrade or repair network components proactively is typically ad hoc and prone to errors. These errors include failing to repair a network component that is expected to breakdown or fixing a network component that is not likely to breakdown within the foreseeable future.

Planned maintenance on a routine basis is insensitive to internal network conditions, which could necessitate earlier or later preventive intervention. Examples include measured changes in network performance that have not yet reached critical levels, but show a trend which can be predicted to reach critical levels within a predetermined time interval. These examples illustrate instances where routine maintenance may not correct a potential network problem in a timely manner.

In addition to internal network conditions, routine maintenance is insensitive to external network conditions that could necessitate earlier or later preventative intervention. Examples include company policy changes regarding maintenance frequency and changes in the network, such as new features, or equipment installed in the network, that may affect the load handled by a given network component. Moreover, planned maintenance cannot capitalize upon factors that influence the priority of an activity. For example, if technicians are on-site to handle emergency network maintenance, and routine maintenance is scheduled at the site for the following week, a planned maintenance system may not inform the technicians to handle the emergency and routine maintenance work at the same time.

Therefore, it is desirable to provide a software tool that proactively monitors conditions both internal and external to the network to anticipate unacceptable network performance and propose appropriate and efficient solutions.

SUMMARY OF THE INVENTION

A software tool consistent with this invention for proactively monitoring a network comprises means for receiving information from a plurality of sources in communication with the network; means for analyzing the received information to anticipate the performance of at least one of a plurality of components in communication with the network; and means for predicting when the performance of the network to will exceed a predetermined threshold based on the anticipated performance of at least one of the plurality of components.

A method consistent with this invention for monitoring a network comprises receiving information from a plurality of sources in communication with the network; analyzing the received information to anticipate the performance of at least one of a plurality of components in communication with the network; and predicting when the performance of the network will exceed a predetermined threshold based on the anticipated performance of at least one of the plurality of components.

Both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred embodiments of the invention and, together with the preceding general description and the following detailed description, explain the principles of the invention.

In the drawings.

DETAILED DESCRIPTION OF THE INVENTION

Reference will now be made in detail to the construction and operation of embodiments consistent with the present invention that are illustrated in the accompanying drawings. In those drawings, the same reference numbers designate like elements and operations.

A software tool consistent with the present invention performs automated proactive system and network maintenance by predicting unacceptable network performance. This prediction can, for example, be based on company policy regarding maintenance procedures, the time required to complete maintenance work, performance criteria, observed changes in the network (e.g., either in the software, hardware, or traffic), and projected performance criterion. Predicting unacceptable system performance involves taking appropriate action to avoid "out-of-tolerance" or undesirable performance of part or all of a network or system when such undesirable behavior can be predicted. An appropriate action is determined based on time-to-correct, scheduled maintenance activity, company policy, criticality of components, consequences of failure, and other criteria. In addition to predicting unacceptable network performance, the software tool schedules maintenance work and updates schedules based upon measured data from other network components.

To perform the foregoing operation, the software tool takes account of prior information (e.g., company repair and replacement policy, knowledge of system load under different conditions, knowledge of the effect of changing the network in specific ways), system performance data gathered from network components, and information from network planning tools and maintenance scheduling tools to optimize preventative network maintenance.

Figure 1:
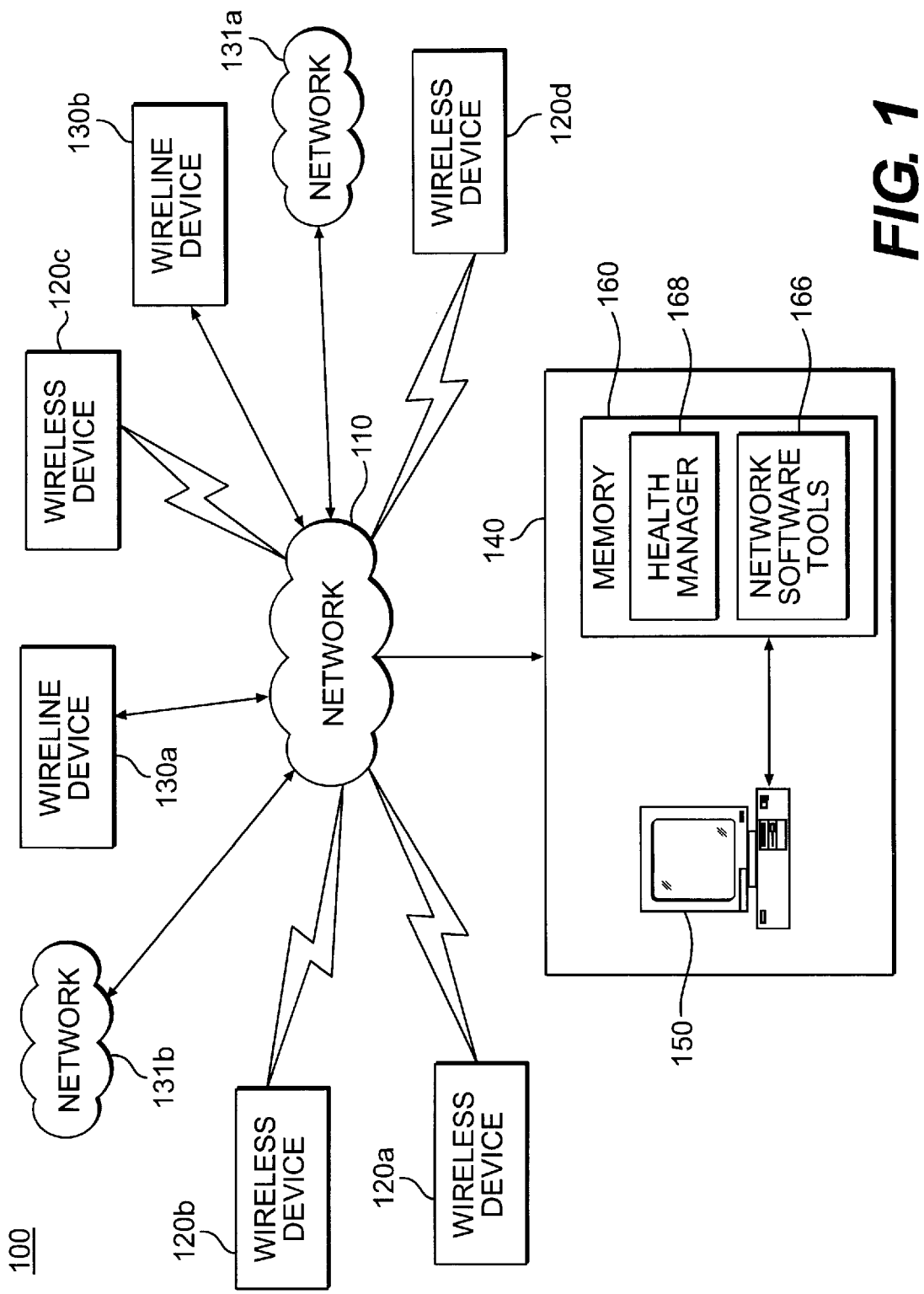
FIG. 1 illustrates a system for monitoring the health of a network consistent with the present invention.

FIG. 1 illustrates a system 100 for monitoring the health of a network consistent with the present invention. System 100 includes a network 110, wireless devices 120a–120d, wireline devices 130a, 130b and other networks 131a, 131b. One skilled in the art will appreciate that system 100 can either include a network of components (e.g., telecommunications network) or a stand-alone unit (e.g., vending machine). Therefore, the system configuration of FIG. 1 is merely an example of one configuration for implementing embodiments consistent with the present invention.

Network 110 represents a combination of components that communicate over a prescribed communication media. In FIG. 1, for example, network 110 represents a telecommunications network infrastructure, such as a wide area network (WAN), that supports wireless and wireline communications. To provide such support, network 110 may include a plurality of switching devices, baystations, and cell sites that facilitate routing wireless and wireline signals between two or more end terminals. Network 110 may also be configured to operate in a local environment, such as a local area network (LAN), that supports one or more peripheral devices.

Wireless devices 120a–120d communicate with network 110 over a wireless communication channel. These devices may include personal communication devices (PCSs), cellular telephones, pagers, devices operatively connected to a wireless modem, and any other communication device that can send and/or receive voice or data signals over a wireless communication channel. Although FIG. 1 only illustrates four wireless devices 120a–120d, system 100 may be configured to operate with a myriad of different wireless devices.

Wireline devices 130a, 130b communicate with network 110 over a physical communications channel such as copper or glass fiber. Network devices 131a, 131b may include a wireless communication channel such, as a microwave or high frequency radio channel. These devices may include telephones, fax machines, modems, or any other devices that can send and/or receive voice or data signals over a wired connection to network 110. Although FIG. 1 only illustrates two wireline devices 130a, 130b, system 100 may be configured to operate with a multitude of different wireline devices.

Network management system 140 manages the operation and performance 110 over a communication channel. For example, a network operation may rely on network management system 140 to manage and control the operation of each cell site in the network to ensure that wireless device 120 users receive optimal service during high-peak periods. For simplicity, FIG. 1 illustrates network management system 140 as an environment separate from network 110. Nevertheless, network management system 140 may be located anywhere within network 110 (e.g., end office), or may be installed at multiple locations within the network 110 (e.g., each cell site). Regardless of the location, network management system 140 may be used to plan and maintain network operation using a workstation 150 and executable software stored in a memory 160. One skilled in the art will also appreciate that Network Management System 140 may be distributed over a plurality of computers and similar devices connected via a network.

Workstation 150 includes a computer terminal capable of controlling the operation of network management system 140. Workstation 150 includes one or more input devices (not shown), a processor (e.g., Intel Pentium® processor) (not shown), and one or more output devices (e.g., monitor). Workstation 150 further includes components typical to a computer terminal connected to a network, such as a modem, temporary memory, and communication software.

Memory 160 is preferably a random access memory (RAM) that stores application software for execution by workstation 150. Preferably, memory 160 stores network software tools 166 and health manager software tool 168 for planning, maintaining, and monitoring network parameters and conditions that may affect the level of network performance. Tools 166 and 168 can also be resident on any acceptable computer-readable medium.

Network software tools 166 are computer-executable programs that provide network management functionality to network 110 through network management system 140. Health manager software tool 168 is also a computer-executable program that proactively monitors network health, anticipates unacceptable network performance, alerts a network operator of the unacceptable network performance, and automatically schedules network maintenance based on anticipated unacceptable network performance. Workstation 150 may implement these software tools as necessary to create an automated network management system that continuously manages and monitors network 100 parameters and conditions over time. These software tools may also be invoked or configured by a user of workstation 150 to provide customized network management and maintenance. The operation of network software tools 166 and health manager software tool 168 is described below with respect to FIGS. 2 and 3.

Figure 2:
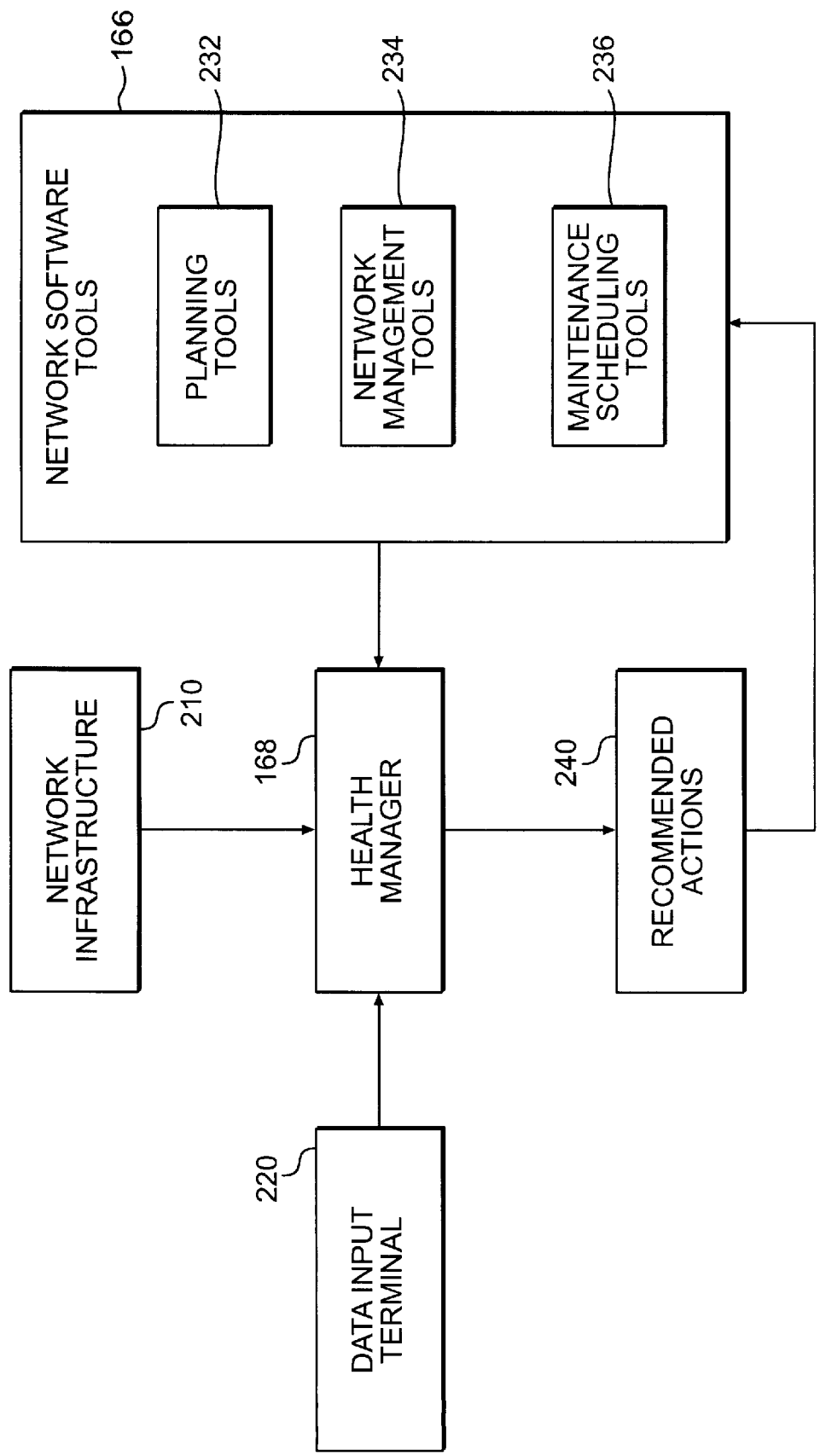
FIG. 2 illustrates data flow through the system of FIG. 1 consistent with the present invention.

FIG. 2 illustrates data flow through the system of FIG. 1 consistent with the present invention. The data flow illustrated in FIG. 2 represents the transfer of information from various components of system 100 to health manager software tool 168. Preferably, health manager software tool 168 reads information from network infrastructure 210, data input terminal 220, and network software tools 166. One skilled in the art will appreciate that health manager software tool 168 may receive information from virtually any component of system 100. Therefore, depending on the system environment, health manager software tool 168 can be configured to read and manipulate a wide variety of system data.

Network infrastructure 210 includes network 110, wireless devices 120a–120d, and wireline devices 130a, 130b. For example, in a telecommunications environment, network infrastructure 210 may include four routing switches, six baystations, and eight cell sites. Each of these components operates collectively to provide telecommunication services to subscribers (e.g., a PCS subscriber). Preferably, network infrastructure 210 further includes sensors (not shown) that collect operational data from each component and report these data to health manager software tool 168. These sensors may reside in each component or otherwise communicate with each component to collect the operational data. The operational data may include performance data, traffic data, or any other data related to component operation. For instance, a sensor can record the number of calls routed through each routing switch for a specified period of time or the number of subscribers served by each cell site at any given time of day. Typically, service providers collect this information to determine network loads during peak and off-peak time periods. Preferably, health manager software tool 168 can be configured to read recorded operational data at specified times, such as during "slow" periods of the day (e.g., 2 a.m.). Alternatively, the sensors can be configured to transfer recorded information to health manager software tool 168 at periodic intervals.

Data input terminal 220 includes a computer terminal operated by a user to provide general information to health manager software tool 168. Preferably, data input terminal 220 includes workstation 150 located in the network management system 140 environment. Nevertheless, data input terminal 220 can be any terminal that has access to health manager software tool 168 through a wireline or wireless communication channel. Health manager software tool 168 reads general information entered into data input terminal 220 by a user. For example, health manager software tool 168 may read company policy information that requires upgrading network operation upon reaching 80 percent capacity. In addition, health manager software tool 168 may read maintenance practice information that identifies scheduled site visits by maintenance personnel (e.g., repairperson visits site every second Tuesday of the month).

Moreover, health manager software tool 168 may read general information from data input terminal 220. For instance, data input terminal 220 may store information disclosing that Mother's Day is the busiest day of the year with regard to subscriber use of wireless and wireline devices. Based on this information, health manager software tool 168 anticipates an increase in network load on Mother's Day and proposes solutions to a network operator for handling the potential load increase. Health manager software tool 168 may also read additional information relevant to network operation to predict unacceptable network performance and suggest appropriate remedial measures.

Network software tools 166 obtain information pertinent to network planning, management, and maintenance. Tools 166 include planning tools 232, network management tools 234, and maintenance scheduling tools 236. Network software tools 166, as well as other components of system 100, obtain information that changes over time. As the information in network software tools 166 changes, health manager software tools 168 updates its files to ensure network health is not compromised.

Planning tools 232 acquire information relating to planned changes in the configuration of network 110. These planned changes include the installation of additional components to the network, upgrading existing network equipment, or removing components from the network. Each of these scenarios can affect network operation and performance. Therefore, health manager software tool 168 reads information from planning tools 232 to predict unacceptable network performance based on anticipated changes.

Network management tools 234 acquire information relating to network inventory, operation and performance. This information may include the number of dropped handoffs in a wireless communication network, the number of operable cell sites, and the number of subscribers each cell site can support. Network management tools 234 obtain this information from predetermined locations on the network that monitor changes in network parameters (e.g., dropped handoffs). Moreover, network management tools 234 set network alarm levels that are activated when certain network thresholds are exceeded (e.g., number of wireless subscribers exceed load capacity of cell site). In essence, network management tools 234 maintain a continuously updated record of network performance and operation. Health manager software tool 168 reads network performance and operational information from network management tools 234 to predict unacceptable network performance and propose solutions.

Maintenance scheduling tools 236 acquire information relating to network maintenance activity. These software tools are updated by a user (e.g., network operator) to include information about network component failure, repair activity, routine maintenance schedule information, and other emergency maintenance schedule information. Health manager software tool 168 reads this information and schedules maintenance repairs, for example, to address predicted network problems based on a failed network component.

Although health manager software tool 168 can monitor network parameters and conditions by reading information from system 100 components as described, tool 168 can also anticipate the performance of system 100 components by predicting unacceptable network performance based on the information and by recommending actions 240 for correcting predicted problems.

Health manager software tool 168 anticipates the performance of system 100 components by projecting performance of network components forward in time, preferably during "slow" periods of system operation. The projected performance of network components is compared with performance alarm levels set by network management tools 234 and performance network component thresholds typically determined by manufacturer specifications. The latter thresholds may be entered into data input terminal 220 and read by health manager software tool 168. In addition, these thresholds may be modified by a user to provide a safety margin for network operation with user-settable defaults.

By reading information from each component of system 100, health manager software tool 168 monitors other operational conditions and performance trends. This process allows health manager software tool 168 to learn from experience. For example, health manager software tool 168 can anticipate that Mother's day will be busy and predict that 2 a.m. on Monday morning will be quiet. To this end, health manager software tool 168 can determine system component performance based on anticipated system activity during a particular period of time.

When tool 168 predicts component performance to exceed its associated threshold within a predetermined period (e.g., three months) based on monitored operational conditions and performance trends, health manager software tool 168 generates a warning alert (e.g., a flashing icon, an audible alarm, or other user-configurable device). As the end of the predetermined period gets closer, the health manager software tool 168 escalates the warning. In addition, health manager software tool 168 notifies a user of the time to threshold, estimated time to fix a network problem, details of the problem, probable cause of the problem, and impact to the network. Preferably, this information is presented to the user via a graphical user interface.

Figure 3:
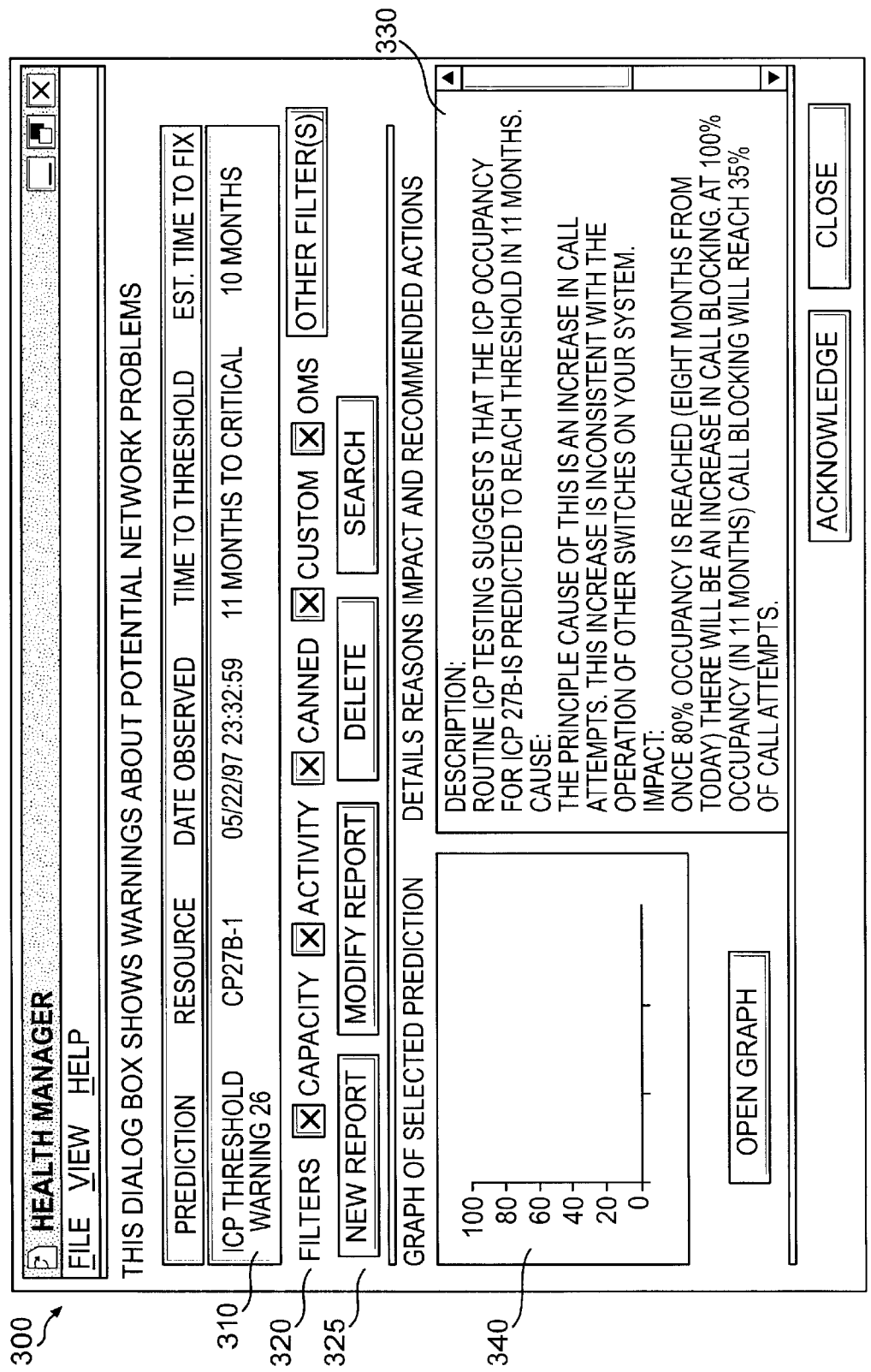
FIG. 3 illustrates a graphical user interface for monitoring the health of a network consistent with the present invention.

FIG. 3 illustrates a graphical user interface 300 for monitoring the health of a network consistent with the present invention. Graphical user interface 300 may be generated by health manager software tool 168 on workstation 150 of network management system 140 or any computer terminal capable of accessing health manager software tool 168. Graphical user interface 300 includes a plurality of fields which alert a user of unacceptable network performance based on the anticipated performance of system components and proposes appropriate solutions. These fields of graphical user interface 300 include a predicted problem field 310, filter field 320, report field 325, description field 330, and graph field 340. One skilled in the art will appreciate more or less fields may be included in graphical user interface 300 as desired by the user.

Predicted problem field 310 includes a plurality of categories that provide information about a potential network problem. Preferably, these categories include prediction, resource, date observed, time to threshold, and estimated time to fix. As illustrated in FIG. 3, the prediction category identifies a potential network problem and generates a warning. For example, the number of subscribers occupying an intelligent control point (ICP) of a telecommunications network may be approaching a predetermined threshold set by a network operator. The resource category identifies the system component (e.g., ICP 27B-1) predicted to be the source of the potential network problem. The "date-observed" category indicates the month, day, year, hour, minute, and second that health manager software tool 168 identified the potential network problem. The "time-to-threshold" category indicates the time (e.g., in months) when the potential network problem is predicted to become critical. Finally, the estimated-time-to-fix category indicates the approximate amount of time needed to correct the potential network problem. This period includes, for example, the time needed to order and install a part that needs replacing. Categories may be added, replaced, or deleted from this field as desired by a user.

Filter field 320 allows a user to configure graphical user interface 300 to display or suppress specific health manager software tool 168 information. For example, as illustrated in FIG. 3, a user can filter (i.e., suppress) capacity and activity information from graph field 340 (described below) by selecting "Capacity" and "Activity" using an input device, such that an "x" appears. Any information obtained or generated by health manager software tool 168 can be filtered.

Report field 325 allows a user to select a new report, modify an existing report, delete a report, or search for a report. Selecting "New Report" generates a new report on another potential network problem. Selecting "Modify Report" allows a user to update an existing report with new information. Selecting "Delete" allows a user to delete a report and selecting "Search" allows a user to search for an existing report.

Description field 330 is a text-based field that provides a description of a potential network problem, the cause of the network problem, the impact of the network problem, and recommended actions to take to correct the potential problem. For example, as illustrated in FIG. 3, health manager software tool 168 has determined that ICP occupancy for ICP 27B is predicted to reach threshold in 11 months. This determination is made using information read from system components as described above with reference to FIG. 2. The cause of the problem stems from an increase in call attempts that is inconsistent with the operation of other switches in the system. The impact, as determined by health manager software tool 168, is an increase in call blocking once 80 percent occupancy is reached in eight months. At 100 percent occupancy (in 11 months), call blocking will reach 35 percent of call attempts. Based on this criteria, health manager software tool 168 recommends corrective actions such as increasing the number of switches in the ICP 27B environment to accommodate the increased occupancy. After recommending corrective actions, health manager software tool 168 schedules pro-active maintenance based on information read from system components (e.g., an anticipated fail date, importance of the failed component to the network, maintenance personnel availability, and company policy).

Figure 4A:
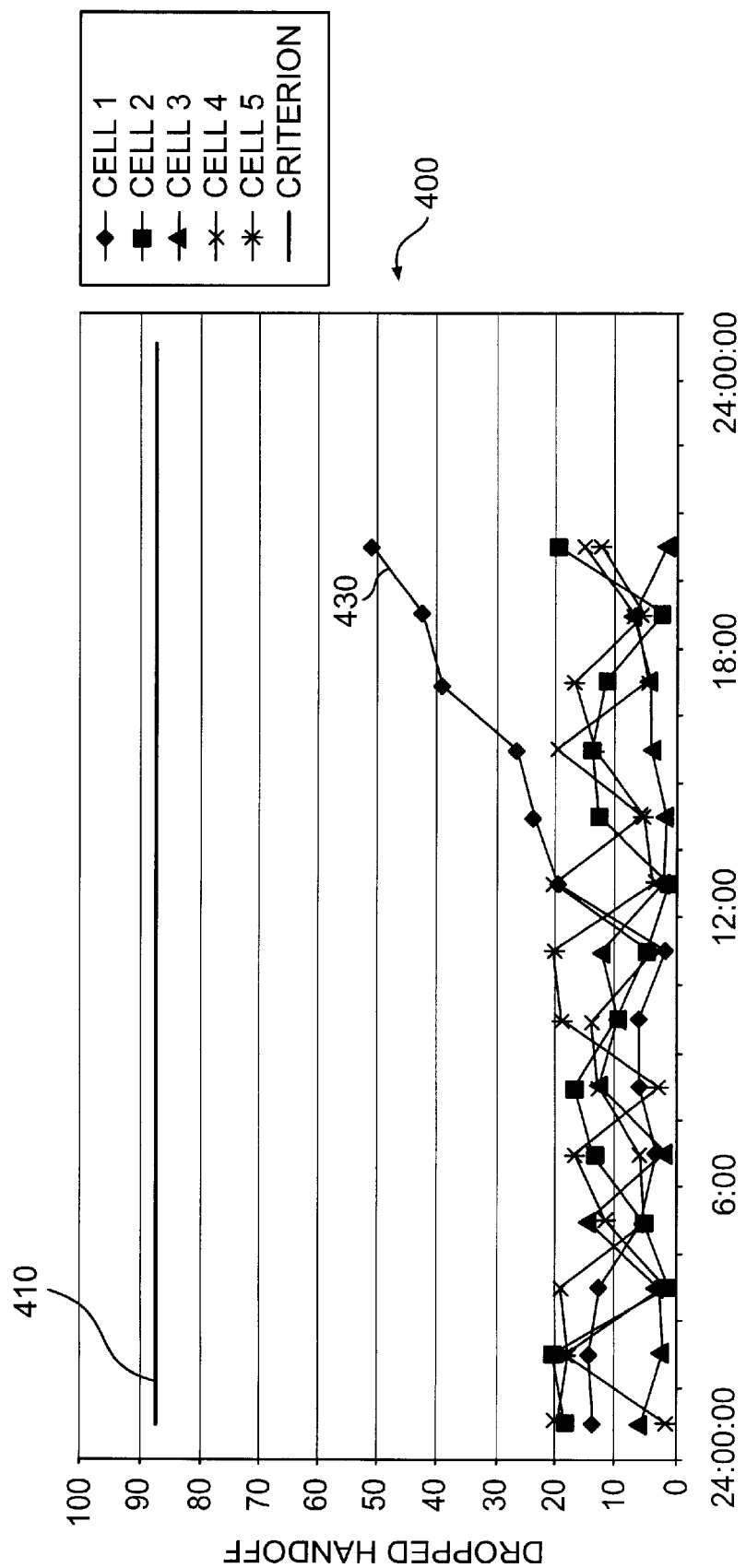
FIG. 4a illustrates a graph of network component performance for a specified time period consistent with the present invention.
Figure 4B:
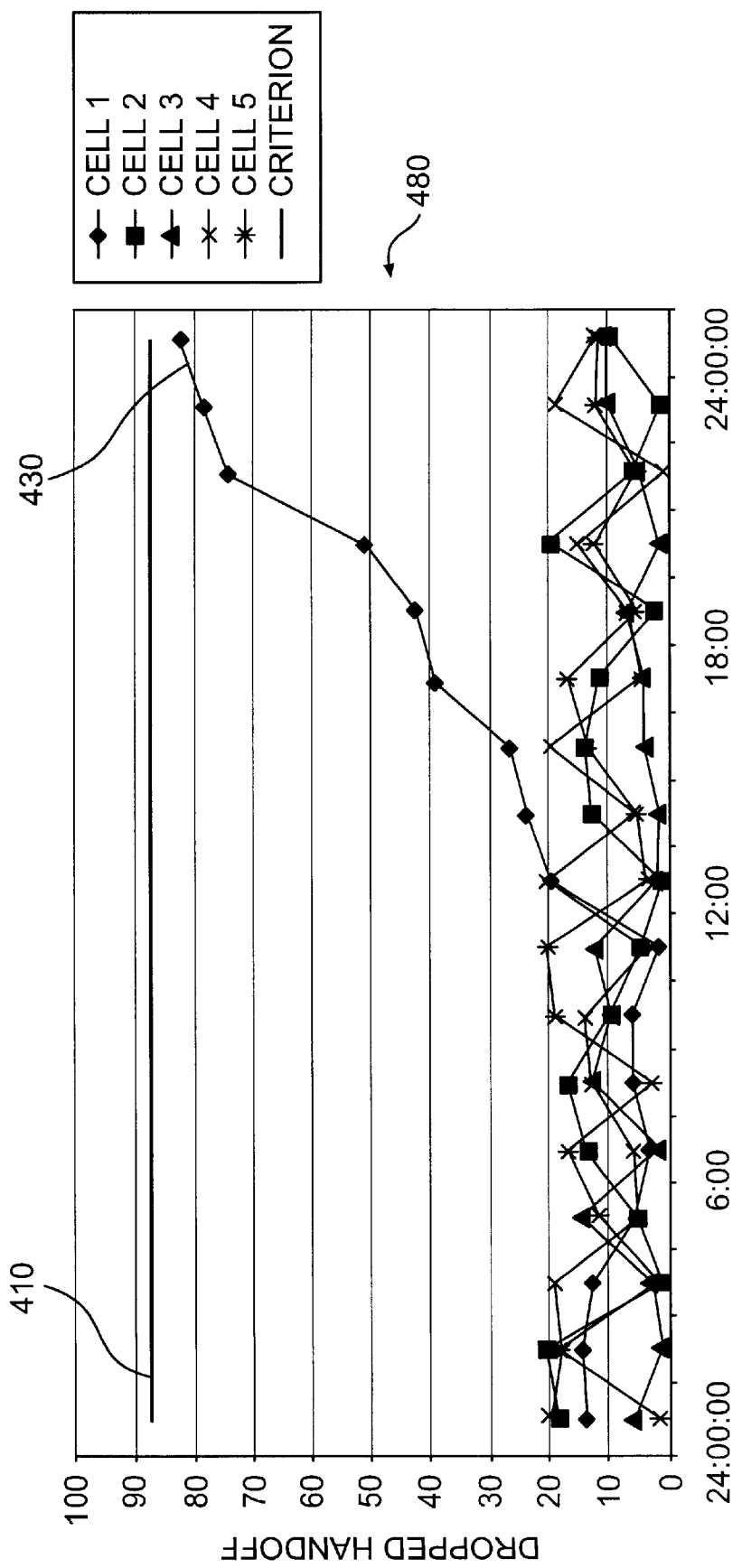
FIG. 4b illustrates a graph of predicted network component performance for a projected time period consistent with the present invention.

Graph field 340 provides a graphical representation of a potential network problem over time. FIG. 4a and FIG. 4b illustrate examples of graphical representations created in graph field 340. One skilled in the art will appreciate that the graphical representations created in graph field 340 may vary depending on the input values generated in a particular system environment.

FIG. 4a illustrates a graph 400 of network component performance for a specified time period consistent with the present invention. Specifically, graph 400 illustrates a dropped handoff rate (e.g., on a scale of 1–100) of cells within a telecommunications network over time. The time period illustrated in graph 400 is from 12 a.m. to 8 p.m. on the day of May 1, 1998. As indicated by the legend in FIG. 4a, the dropped handoff rate for each of five cells is plotted on graph 400. A criterion line 410 (i.e., threshold) is also plotted on graph 400. This criterion line indicates a maximum dropped handoff rate that should not be exceeded. Health manager software tool 168 monitors dropped handoff rate activity during the specified period and alerts a network operator of any inconsistencies. Graph 400 indicates that between the hours of 12 p.m. and 8 p.m., the dropped handoff rate for "Cell 1" 430 is steadily increasing in a manner inconsistent with the other cells.

FIG. 4b illustrates a graph 480 of predicted network component performance for a projected time period consistent with the present invention. In this graph, the time period is projected four hours ahead of that shown in graph 400, illustrated in FIG. 4a, to a full 24-hour period. While health manager software tool 168 predicts the dropped handoff rate for "Cell 2," "Cell 3," "Cell 4," and "Cell 5" to be consistent, it predicts the dropped handoff rate of "Cell 1" 430 to escalate between the hours of 8 p.m. and 12 a.m. to over 80 percent. Based on previous service records, health manager software tool 168 "knows" that three hours are needed to correct the unacceptable network performance at "Cell 1." Therefore, health manager software tool 168 alerts the network operator at 8 p.m. that the dropped handoff rate of "Cell 1" will approach critical levels by midnight. This alert function allows the network operator ample time to fix the problem before the dropped handoff rate reaches the criterion line.

The following is an example of how health manager software tool 168 is implemented for a particular system application. Initially, health manager software tool 168 reads information from a plurality of sources regarding a System X. This information includes company policy information entered into workstation 150 by a network operator requiring System X to be updated at 80 percent load. Maintenance practice information from maintenance scheduling tools 236 regarding the installation of Part X in System X in four months during a routine maintenance visit is also read by health manager software tool 168. In addition, "real world" or general information stored in workstation 150 indicating that three months are required to obtain Part X is read by health manager software tool 168. Additional information includes system behavioral information indicating that a Feature F increases load on System X by 15 percent and Part X decreases load 30 percent. This information can be read from data files that relate to System X operation (e.g., System X user manuals in electronic form) or "learned" by health manager software tool 168 from previous system readings.

System X performance data read by health manager software tool 168 indicates that System X was running at 55 percent yesterday and that load is increasing at five percent per month over the last six months. This information is obtained through performance records generated health manager software tool 168 while monitoring performance trends over a six month period. This information may also be used to predict System X performance for the next six months. Health manager software tool 168 also gathers information from planning tools 232 and network management tools 234, such as "Feature F is planned to be installed immediately into System X."

After health manager software tool 168 reads information from the noted components, it predicts unacceptable network performance. For example, health manager software tool 168 may determine that without Feature F, System X will reach company policy mandated load maximum in five months. If Feature F is added to System X, health manager software tool 168 anticipates that capacity will be reached in two months. However, three months are required to obtain Part X to correct the load problem. In this instance, health manager software tool 168 identifies the timing discrepancy between reaching capacity and obtaining Part X as an unacceptable network performance (i.e., violation of the 80 percent load policy). Moreover, health manager software tool 168 alerts the network operator of the unacceptable network performance through graphical user interface 300.

If delivery time for Part X is one month, then health manager software tool 168 can order the part (or alert to the network operator to order the part) and reschedule the routine maintenance visit (via maintenance scheduling tools 236) to ensure Part X is installed before 80 percent load is reached. If the predicted capacity date occurs shortly after the planned maintenance visit, health manager software tool 168 alerts the network operator to add Part X to the planned maintenance activities. If health manager software tool 168 lacks access to a maintenance schedule to determine the lead time to order parts or scheduled maintenance visits, then it alerts the network operator within three months (or other user-definable value) of any anticipated problem.

Figure 5:
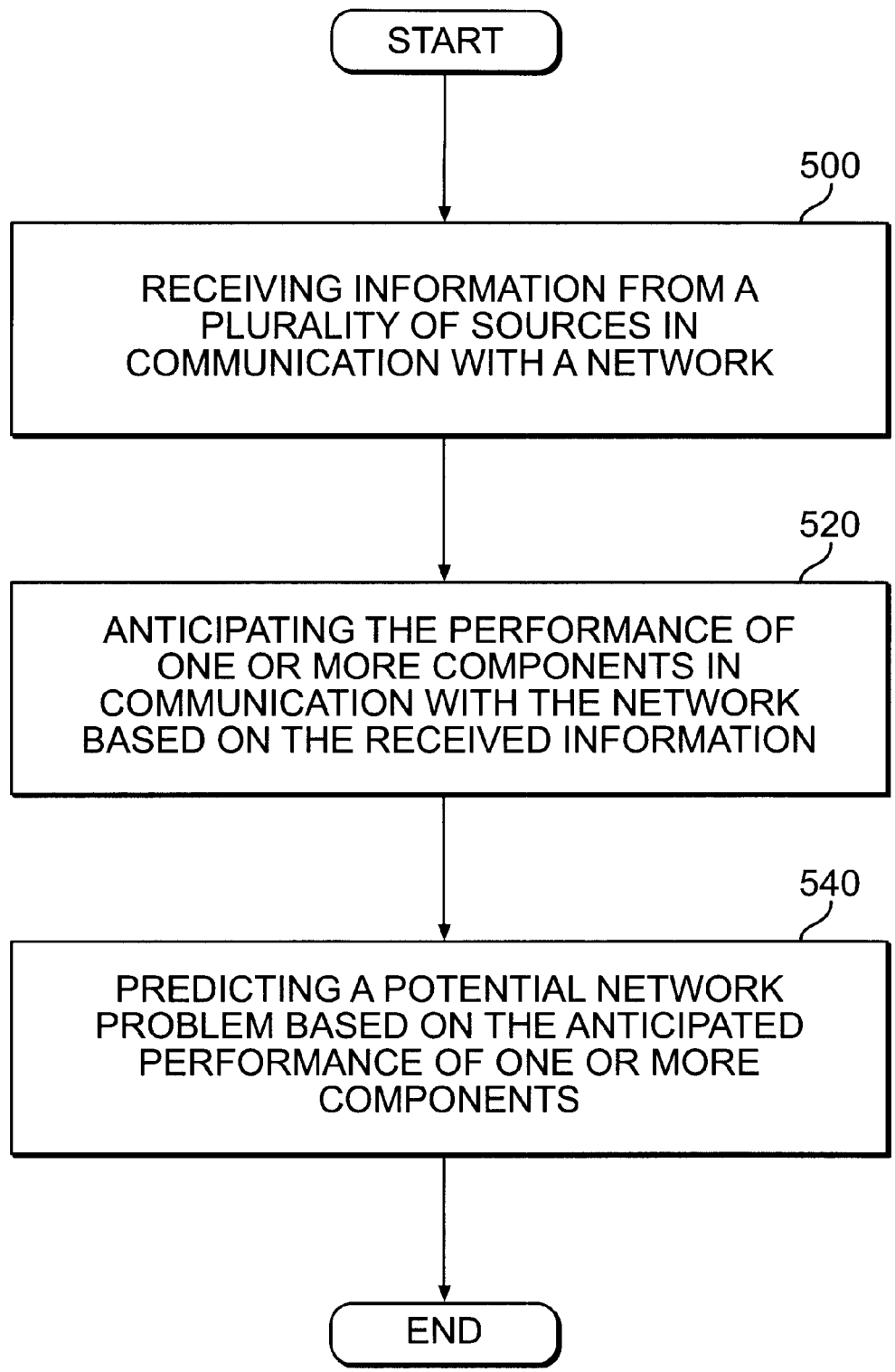
FIG. 5 illustrates a flowchart of a method for monitoring the health of a network consistent with the present invention.

FIG. 5 illustrates a flowchart of a method for monitoring the health of a network consistent with the present invention. The method begins with health manager software tool 168 receiving information from a plurality of sources in communication with a network (step 500). Health manager software tool 168 then anticipates the performance of one or more network components based on the received information (step 520). Health managers software tool 168 predicts unacceptable network performance based on the anticipated performance of one or more components (step 540).

Health manager software tool 168 proactively monitors internal and external network conditions to predict unacceptable network performance and propose appropriate and efficient solutions. Doing so allows a network operator to manage network operation and performance proactively without manually monitoring each component of the network for potential problems. If unacceptable network performance does exist, a network operator can rely on health manager software tool 168 to proactively schedule maintenance based upon the anticipated fail date, importance of the component in the network, repairperson availability, and company policy.

While embodiments and methods consistent with the present invention have been illustrated and described, those skilled in the art will understand that various changes and modifications may be made, and equivalents may be substituted for elements thereof, without departing from the true scope of the invention.

In addition, many modifications may be made to adapt a particular element, technique or implementation to the teachings of the present invention without departing from the central scope of the invention. Therefore, this invention should not be limited to the particular embodiments and methods disclosed herein, but should include all embodiments falling within the scope of the appended claims.

What is claimed is:

1. A software tool for monitoring a network, comprising:
   means for receiving information from a plurality of sources in communication with the network relating to the past and present performance of a network;
   means for analyzing the received information to anticipate the predicted performance of at least one of a plurality of components in communication with the network for a projected time period; and
   means for predicting a time to threshold when the performance of the network will exceed a predetermined threshold condition based on the anticipated performance of at least one of the plurality of components.

2. The tool of claim 1 further comprising
   means coupled to the predicting means for alerting a user of the predicted network performance.

3. The tool of claim 2 wherein the alerting means includes
   means for configuring the network to alert a user in a predetermined manner.

4. The tool of claim 2 wherein the alerting means includes
   means for using a visual indicator to alert the user of the predicted network performance.

5. The tool of claim 2 wherein the alerting means includes
   means for using an audible alarm to alert the user of the predicted network performance.

6. The tool of claim 1 further comprising
   means for automatically scheduling network maintenance based on the anticipated performance of at least one of the plurality of components and predicted network performance.

7. The tool of claim 6 wherein the scheduling means includes
   means for updating scheduled network maintenance based on the information received from at least one of the plurality of sources in communication with the network.

8. The tool of claim 1 further comprising
   means for proposing solutions to the predicted network performance.

9. The tool of claim 1 wherein the receiving means includes
   means for receiving network performance data from at least one of a plurality of sources in communication with the network.

10. The tool of claim 1 wherein the receiving means includes
    means for receiving network traffic data from at least one of a plurality of sources in communication with the network.

11. The tool of claim 1 wherein the receiving means includes
    means for receiving network inventory data from at least one of a plurality of sources in communication with the network.

12. The tool of claim 1 wherein the receiving means includes
    means for receiving network breakdown data from at least one of a plurality of sources in communication with the network.

13. The tool of claim 1 wherein the receiving means includes
    means for receiving network repair activity data from at least one of a plurality of sources in communication with the network.

14. The tool of claim 1 wherein the analyzing means includes
    means for using a predetermined maintenance policy to anticipate the performance of one of the plurality of components.

15. The tool of claim 1 wherein the analyzing means includes means for using the predetermined time required to complete maintenance work to anticipate the performance of one of the plurality of components.

16. The tool of claim 1 wherein the analyzing means includes means for using network performance criteria to evaluate the anticipated performance of one of the plurality of components.

17. The tool of claim 1 wherein the analyzing means includes means for using detected network changes to anticipate the performance of one of the plurality of components.

18. The tool of claim 1 wherein the analyzing means includes means for using network plans to anticipate the performance of one of the plurality of components.

19. The tool of claim 1 wherein the predicting means includes means for predicting network performance when the anticipated performance of one of the plurality of components exceeds a predetermined threshold.

20. A computer readable medium containing instructions for directing a computer to perform a process for monitoring a network, comprising:

means for causing a computer to receive information from a plurality of sources in communication with the network relating to the past and present performance of a network;

means for causing a computer to analyze the received information to anticipate the predicted performance of at least one of a plurality of components in communication with the network for a projected time period; and means for causing a computer to predict a time to threshold when the performance of the network will exceed a predetermined threshold condition based on the anticipated performance of at least one of the plurality of components.

21. The medium of claim 20 further comprising means for causing a computer to alert a user of the predicted network performance.

22. The medium of claim 21 wherein the means for causing a computer to alert includes means for causing a computer to configure the network to alert a user in a predetermined manner.

23. The medium of claim 21 wherein the means for causing a computer to alert includes means for causing a computer to use a visual indicator to alert the user of the predicted network performance.

24. The medium of claim 21 wherein the means for causing the computer to alert includes means for causing a computer to use an audible alarm to alert the user of the predicted network performance.

25. The medium of claim 20 further comprising means for causing a computer to automatically schedule network maintenance based on the anticipated performance of at least one of the plurality of components and predicted network performance.

26. The medium of claim 25 wherein the means for causing the computer to schedule includes means for updating scheduled network maintenance based on the information received from at least one of the plurality of sources in communication with the network.

27. The medium of claim 20 further comprising means for causing a computer to propose a solution to the predicted network performance.

28. The medium of claim 20 wherein the means for causing a computer to receive information includes means for causing a computer to receive network performance data from at least one of a plurality of sources in communication with the network.

29. The medium of claim 20 wherein the means for causing a computer to receive information includes means for causing a computer to receive network traffic data from at least one of a plurality of sources in communication with the network.

30. The medium of claim 20 wherein the means for causing a computer to receive information includes means for causing a computer to receive network inventory data from at least one of a plurality of sources in communication with the network.

31. The medium of claim 20 wherein the means for causing a computer to receive information includes means for causing a computer to receive network breakdown data from at least one of a plurality of sources in communication with the network.

32. The medium of claim 20 wherein the means for causing a computer to receive information includes means for causing a computer to receive network repair activity data from at least one of a plurality of sources in communication with the network.

33. The medium of claim 20 wherein the means for causing a computer to analyze the received information includes means for causing a computer to use a predetermined maintenance policy to anticipate the performance of one of the plurality of components.

34. The medium of claim 20 wherein the means for causing a computer to analyze the received information includes means for causing a computer to use a predetermined time required to complete maintenance work to anticipate the performance of one of the plurality of components.

35. The medium of claim 20 wherein the means for causing a computer to analyze the received information includes means for causing a computer to use network performance criteria to evaluate the anticipated performance of one of the plurality of components.

36. The medium of claim 20 wherein the means for causing a computer to analyze the received information includes means for causing a computer to use detected network changes to anticipate the performance of one of the plurality of components.

37. The medium of claim 20 wherein the means for causing a computer to analyze the received information includes means for causing a computer to use network plans to anticipate the performance of one of the plurality of components.

38. The medium of claim 20 wherein the means for causing a computer to predict performance includes means for causing a computer to predict network performance when the anticipated performance of one of the plurality of components exceeds a predetermined threshold.

39. A method for monitoring a network, comprising:

receiving information from a plurality of sources in communication with the network relating to the past and present performance of a network;

analyzing the received information to anticipate the predicted performance of at least one of a plurality of components in communication with the network for a projected time period; and predicting a time to threshold when the performance of the network will exceed a predetermined threshold condition based on the anticipated performance of at least one of the plurality of components.

40. The method of claim 39 further comprising alerting a user of the predicted network performance.

41. The method of claim 40 wherein alerting includes configuring the network to alert a user in a predetermined manner.

42. The method of claim 40 wherein alerting includes using a visual indicator to alert the user of the predicted network performance.

43. The method of claim 40 wherein alerting includes using an audible alarm to alert the user of the predicted network performance.

44. The method of claim 41 further comprising automatically scheduling network maintenance based on the anticipated performance of at least one of the plurality of components and predicted network performance.

45. The method of claim 44 wherein scheduling includes updating scheduled network maintenance based on the information received from at least one of the plurality of sources in communication with the network.

46. The method of claim 39 further comprising proposing a solution to the predicted network performance.

47. The method of claim 39 wherein the receiving information include receiving network performance data from at least one of a plurality of sources in communication with the network.

48. The method of claim 39 wherein receiving information includes receiving network traffic data from at least one of a plurality of sources in communication with the network.

49. The method of claim 39 wherein receiving information includes receiving network inventory data from at least one of a plurality of sources in communication with the network.

50. The method of claim 39 wherein receiving information includes receiving network breakdown data from at least one of a plurality of sources in communication with the network.

51. The method of claim 39 wherein receiving information includes receiving network repair activity data from at least one of a plurality of sources in communication with the network.

52. The method of claim 39 wherein analyzing information includes useing a predetermined maintenance policy to anticipate the performance of one of the plurality of components.

53. The method of claim 39 wherein the analyzing information includes using the predetermined time required to complete maintenance work to anticipate the performance of one of the plurality of components.

54. The method of claim 39 wherein analyzing information includes using network performance criteria to evaluate the anticipated performance of one of the plurality of components.

55. The method of claim 39 wherein analyzing information includes using detected network changes to anticipate the performance of one of the plurality of components.

56. The method of claim 39 wherein analyzing information includes using network plans to anticipate the performance of one of the plurality of components.

57. The method of claim 39 wherein predicting performance includes predicting network performance when the anticipated performance of one of the plurality of components exceeds a predetermined threshold.

* * * * *

UNITED STATES PATENT AND TRADEMARK OFFICE
CERTIFICATE OF CORRECTION

PATENT NO.    : 6,446,123 B1
DATED         : September 3, 2002
INVENTOR(S)   : Peter R. Ballantine et al.

It is certified that error appears in the above-identified patent and that said Letters Patent is hereby corrected as shown below:

Column 13,
Line 21, "claim 41" should read -- claim 39 --.

Column 14,
Line 17, "useing" should read -- using --.

Signed and Sealed this

Twenty-fourth Day of December, 2002

JAMES E. ROGAN
*Director of the United States Patent and Trademark Office*